Aug. 1, 1933.  A. V. GREEN  1,920,786
CONTAINER OF THE HAND OPENING AND CLOSING TYPE AND COVER THEREFOR
Filed April 5, 1930
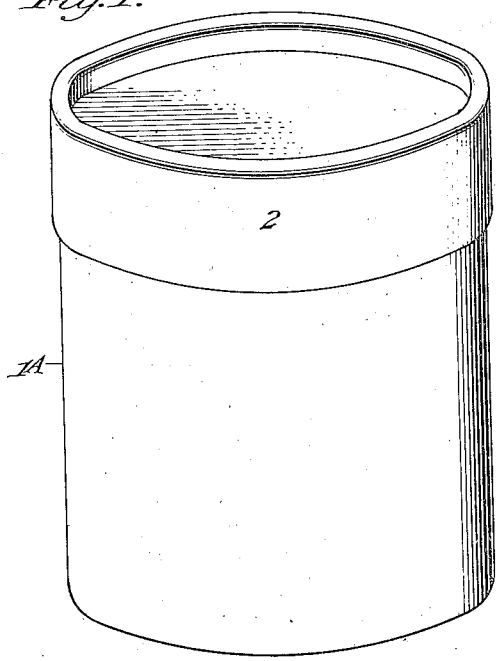
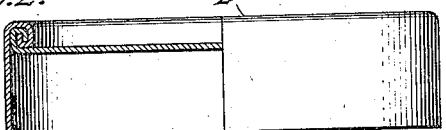
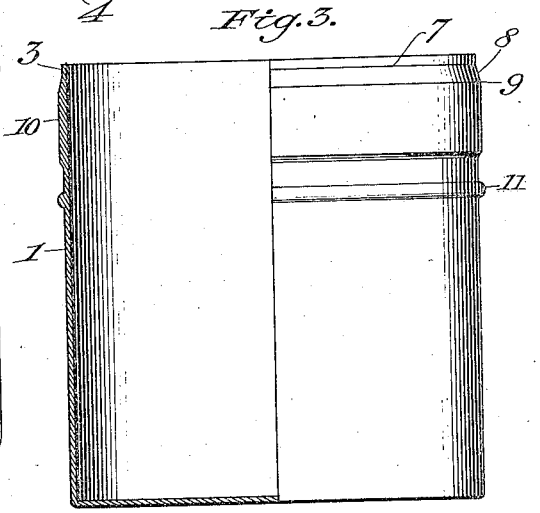
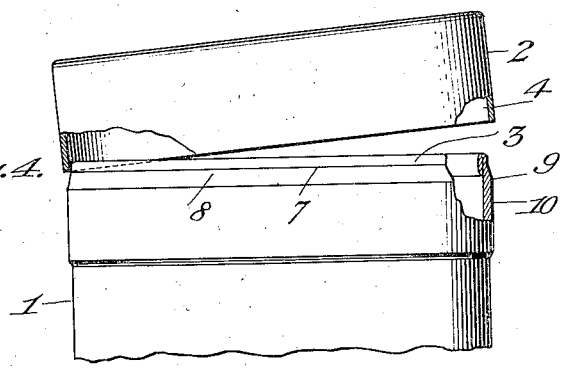
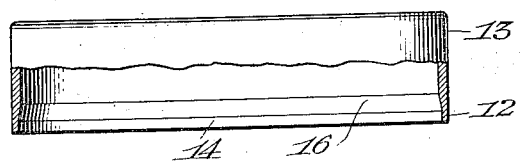
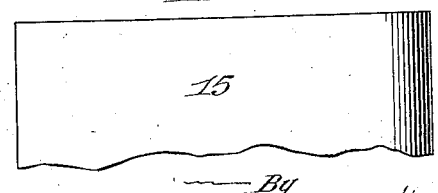
Inventor
Amos V. Green,
By H. S. Bailey Attorney Patented Aug. 1, 1933

1,920,786

UNITED STATES PATENT OFFICE 1,920,786

CONTAINER OF THE HAND OPENING AND CLOSING TYPE AND COVER THEREFOR

Amos V. Green, Denver, Colo.

Application April 5, 1930. Serial No. 441,799

1 Claim. (Cl. 229—5.5)

My invention relates to improvements in "containers" of the hand closing and opening type for receiving and holding and carrying foods and other materials, and which consists of a round, square or hexagon or other shaped box or body portion for holding food or other material, and a cover or lid fitting tightly on it.

And the objects of my invention are:—

First, to provide a container that is made so that the telescoping edges of the cover and the body or box of the container will loosely fit and slide over each other quickly and without any careful and painstaking action on the part of a clerk in placing the cover on the body of the box and that is made with a gradually larger increasing portion at the inner end of the loose fitting edges of the box and its cover, that causes the cover to gradually fit tighter and tighter as it is pushed down over the body of the box until it fits tight enough to confine liquids within it without their leaking out of the container.

Second, to provide a box and cover container that clerks during the rush periods of serving customers, can almost instantly place a cover on a filled container and close it tightly.

Third, to provide a hand closing and opening container consisting of a food or other material receiving and holding box or body portion, the telescoping edges of the box or body portion and of the cover member of which are so arranged relatively to each other, that food dispensing clerks in markets, grocery stores, food preparing and selling stores, restaurant and lunch counters of drug stores can, after placing an order in them, place the cover on them and instantly close the container by quickly moving the edge of the cover in contact with the edge of the box or body portion of the container and pressing it on to it without the slightest loss of time in getting the edge of the cover over the edge of the box or body portion of the container, such as is now experienced in using the containers at present in use on which the covers fit at their edges tight onto the edge of the body of the containers and they fit so tight that considerable time is lost in working a cover on them.

I attain these objects by the mechanism illustrated in the accompanying drawing in which:—

Figure 1 is a perspective view of a hand closing and opening container embodying my invention.

Figure 2 is a central sectional view of the cap portion of the container.

Figure 3 is a central sectional view of the food or other material holding body or box portion of the container.

Figure 4 is a side elevation illustrating the application of the cover to the body of the container by hand closing movement.

Figure 5 illustrates the construction that enables a cover to be quickly and positively applied to the body of a container showing that construction made in the open edge portion of the cover instead of on the body of the container.

Figure 6 shows the body of the container with straight, smooth open edge portion adapted to receive quickly and easily the enlarged edge portion of the cover.

Similar letters of reference refer to similar parts throughout the several views.

Referring to the drawing, the numeral 1A designates a food or other material holding container, complete with its cover on it. This container consists of a food or other material holding body or box portion 1 and a cover portion 2.

The circumferential edge portion 3 of the body of the container has a diameter somewhat less than that of the inner cylindrical surface 4 of the lid 2, and the portion of the container body adjacent the edge portion 3 has a diameter which provides a tight sliding fit with the surface 4 of the lid.

This edge portion of the body of the container that is smaller in diameter than the inner surface of the cover, extends along the body of the container for about a distance that may vary from an eighth of an inch to about a half of an inch, depending on the size of the container, but it is always made long enough to enable the cover to stand vertically over it on the body portion without falling accidentally off from it as the cover then has a self supporting bearing on the body of the container, although it is a loose one, consequently it should be loose enough so that the instant an edge of the cover touches a side edge of the reduced circumferential smaller edge of the body of the container, it can be moved quick enough by a tilting movement over the smaller edge of the container as shown in Figure 4 up to its inner edge 7, where a circumferential enlarging tapering portion 8, is formed, against which it strikes and as it is pressed down, slides up over it and fits tightly on it as it slides up to its top edge 9, over which it moves onto a very slightly larger increasing flat band portion 10, which however, if preferred, may be perfectly flat and straight instead of being slightly tapered larger as just described and on this flat enlarged portion, the lid fits tight enough to hold semi-liquid foods and other materials and also can be made tight enough to hold liquids of all kinds without leaking.

The containers are made of paper or metal or any other suitable material, most of them however, being made of paper and are more or less flexible and the flat band portion if desired, on that account can be raised a little larger in diameter than the rest of the body of the container and also if desired, a bead 11, can be raised circumferentially on its surface a little below where the lower edge of the cover comes when the cover is pressed down tight on the container, and stiffens it to withstand bending-in pressures better than it would if the raised head was not formed on it.

As the forming of the reduced circumferential edge portion of the body of the container when made of substantially the same thickness as those at present in use makes the open edge very thin, I reinforce it on all containers that are made to hold somewhat heavy materials by turning over into it, its edge portion, thus doubling the thickness for a little more than the distance of this reduced circumferential loose fitting member of the cover.

While I have illustrated my quick cover closing container in which the body of the container is reduced in size below the diameter of the edge of the cover in order that the cover can be quickly and easily placed over the edge of the container, the same results can be attained by providing the same construction in an inverted manner to the edge 12 of the cover 13, thus the edge 12 of the cover 13, can be provided with an enlarged circumferential recess 14, that fits loosely over the straight body of the container 15, as illustrated in Figure 5, and providing the cover with a decreasing taper portion 16, at the inner end of its straight enlarged portion 14, and further providing it with a straight, smooth portion of enough smaller diameter to fit tightly over the smooth, straight terminal open end portion of the body of the container. Consequently, the cover would fit just as quickly, loosely and tightly on the open end portion of the container as though the cover receiving construction that embodies my invention, was formed on the open end portion of the container.

My invention contemplates placing the construction that embodies my invention in the cover instead of on the body of the container for certain sizes and for certain uses of the container. I preferably, however, for all general uses of the container, place the construction that embodies my invention on the open edge portion of the body of the container.

My invention provides a simple, practical, quick and positively connecting constructive member between the meeting edges of the body of the container and its cover that enables the cover to be placed practically instantaneously on the body of the container, and while I have described the preferred construction and arrangement of my easy cover fitting container, I do not wish to be limited to the construction and arrangement shown as changes may be made in it without departing from the spirit of my invention.

Having described my invention, what I claim as new and desire to secure by Letters Patent is:—

A combination in a paper container and its cover, of the body portion of the container having a straight rearwardly and upwardly inclined circumferential surface at its open circumferential edge, said edge being folded over inwardly and against the inner surface of the container, and pressed tightly against the said edge portion, thus stiffening and strengthening said edge of the body of said container, the said upwardly extending inclined portion of said end portion having a straight flat upwardly inclined surface extending circumferentially around the body of said container and blending at its upper and highest edge portion into a long straight circumferential edge portion of greater diameter than the body of the container, with a cover member for the body member of said container, said cover having a straight vertical inner side that at its outer edge is of a diameter to fit loosely over the end of the upwardly inclined tapering edge of the body portion of the container and arranged to engage and bear against the upwardly and backwardly inclined surface of the tapering end of said container and slide upon it to the top of the said enlarged long portion of the body of the container when the cover is pressed down over it, whereby a long liquid tight joint is made between the body of the container and its cap.

AMOS V. GREEN.